(12) United States Patent
Chou

(10) Patent No.: US 9,411,056 B2
(45) Date of Patent: Aug. 9, 2016

(54) WIDE DYNAMIC RANGE BIDIRECTIONAL INTEGRATING ELECTROMETER WITH LOW LEAKAGE SOLID-STATE RESET AND RANGE CHANGE OPERATING OVER AN EXTENDED TEMPERATURE RANGE

(71) Applicant: General Electric Company, Schenectady, NY (US)

(72) Inventor: Fred Yu-Feng Chou, Stow, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 56 days.

(21) Appl. No.: 13/755,036

(22) Filed: Jan. 31, 2013

(65) Prior Publication Data
US 2014/0209811 A1 Jul. 31, 2014

(51) Int. Cl.
*G01T 1/18* (2006.01)
*G01T 1/185* (2006.01)

(52) U.S. Cl.
CPC ..................................... *G01T 1/185* (2013.01)

(58) Field of Classification Search
USPC ....................................................... 250/375
See application file for complete search history.

(56) References Cited

U.S. PATENT DOCUMENTS

| 4,050,019 | A | * | 9/1977 | Nirschl | 324/115 |
| 4,717,548 | A | * | 1/1988 | Lee | 422/82.04 |
| 5,426,413 | A | * | 6/1995 | Gulczynski | 341/144 |
| 5,572,118 | A | * | 11/1996 | Lewis | 324/123 R |
| 6,061,009 | A | * | 5/2000 | Krone et al. | 341/143 |
| 6,977,682 | B2 | * | 12/2005 | Mizuno et al. | 348/241 |
| 2009/0045816 | A1 | * | 2/2009 | Robinson | 324/457 |
| 2009/0121151 | A1 | * | 5/2009 | Denton et al. | 250/397 |

* cited by examiner

*Primary Examiner* — David Porta
*Assistant Examiner* — Edwin Gunberg
(74) *Attorney, Agent, or Firm* — Cooper Legal Group, LLC

(57) ABSTRACT

A radiation monitor includes an ionization chamber for detecting radiation that passes into the ionization chamber. The ionization chamber generates a current flow in response to the detected radiation. An electrometer is electrically connected to the ionization chamber for measuring the current flow generated by the ionization chamber. The electrometer is operable in a plurality of modes based on a magnitude of the current flow generated by the ionization chamber. A method of measuring current flow through an electrometer of a radiation monitor is also provided.

9 Claims, 5 Drawing Sheets

US 9,411,056 B2

WIDE DYNAMIC RANGE BIDIRECTIONAL INTEGRATING ELECTROMETER WITH LOW LEAKAGE SOLID-STATE RESET AND RANGE CHANGE OPERATING OVER AN EXTENDED TEMPERATURE RANGE

BACKGROUND OF THE INVENTION

1. Field of the Invention

The present invention relates generally to a radiation monitor and, more particular, to a radiation monitor including an electrometer exhibiting relatively low leakage over a range of temperatures.

2. Discussion of the Prior Art

Radiation monitors are commonly deployed in a location proximate to known radiation sources, such as nuclear power generation stations, to monitor radiation levels. In response to the detection of radiation, radiation monitors will produce a current that is proportional to the quantity of radiation detected. Radiation monitors often use electrometers to convert this relatively low current into a voltage signal for processing.

As part of electrometer arrangements, switches are employed to provide an ability of resetting (i.e., discharging) associated capacitors. It is possible use electronic switches such as Field effect transistor (FET) switch devices. Some specific FET devices such as MOSFET and JFET could be used. Also, is possible to use electromechanical switches such as reed relay devices.

A FET device can be susceptible to current leakage. The amount of current leakage can vary with temperature variation. Specifically, increasing temperature will cause a greater amount of leakage. For example it is possible for the amount of leakage to double for each increase of 10° Celsius in temperature. As such, over a relatively wide temperature range, a FET could have a greatly changing amount of current leakage. Also, such current leakage could begin at temperatures as low as 35° Celsius. Current leakages can be problematic, as they adversely affect the accuracy of radiation detection.

In one effort to avoid the problem of current leakage, the electromechanical switches such as the reed relay devices could be used. However, these reed relay devices are relatively bulky/large in size and have a slow switching speed.

Issues concerning temperature-based leakage variation and/or bulkiness/slowness may not be sufficiently problematic is some uses of electrometer arrangements. However, there are some scenarios in which these issues would be problematic. An electrometer within radiation monitor would be such a scenario. Radiation monitors could be exposed to environmental temperatures that could rise to 50-60° Celsius. Accordingly, it would be beneficial to provide a radiation monitor with an electrometer that exhibits relatively low leakage rates over a wide range of temperatures without the bulk of a reed relay device.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, a radiation monitor includes an ionization chamber for detecting radiation that passes into the ionization chamber. The ionization chamber generates a current flow in response to the detected radiation. An electrometer is electrically connected to the ionization chamber for measuring the current flow generated by the ionization chamber, wherein the electrometer is configured to be operable in a plurality of modes based on a magnitude of the current flow generated by the ionization chamber.

In accordance with another aspect, a radiation monitor includes an ionization chamber for detecting radiation that passes into the ionization chamber. The ionization chamber generates a current flow in response to the detected radiation. An electrometer is electrically connected to the ionization chamber for measuring the current flow of the ionization chamber. The electrometer is configured to be operable in a first mode in response to a measured current within a first range and a second mode in response to a measured current within a second range that is larger than the first range. Current leakage in the first mode and second mode is minimized.

In accordance with another aspect, a method of measuring current flow through an electrometer of a radiation monitor is provided. The method includes the step of providing an ionization chamber for detecting radiation, the ionization chamber generating a current flow in response to detected radiation. The method includes the step of providing the electrometer electrically connected to the ionization chamber for measuring the current flow of the ionization chamber. The method further includes the step of operating the electrometer in a first mode in response to the measured current being within a first range. The method also includes the step of operating the electrometer in a second mode in response to the measured current being within a second range.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
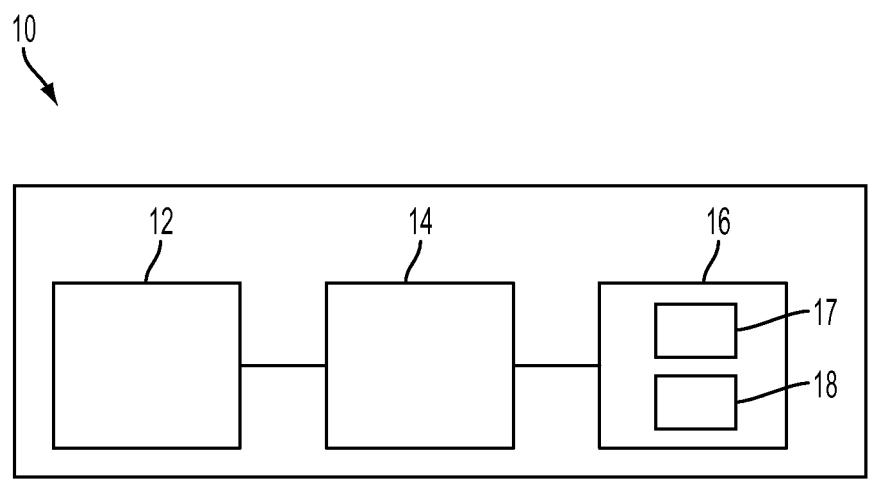
FIG. 1 is a highly schematic block diagram representation of an example radiation monitor including an electrometer.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 highly schematic representation of an example radiation monitor 10 in accordance with one aspect of the present invention. In brief synopsis, the radiation monitor 10 includes an ionization chamber 12 for detecting radiation. The ionization chamber 12 is electrically connected to an electrometer 14 that detects ionization current within the ionization chamber 12. A controller 16 controls the electrometer 14 and stores and measures the ionization current. The electrometer 14 provides for relatively low current leakage even along a relatively broad temperature range (e.g., up to 50° to 60° C.) while accurately detecting a wide range of ionization currents.

It is to be appreciated that FIG. 1 depicts the radiation monitor 10 in a highly schematic/generic representation for illustrative purposes. Indeed, FIG. 1 merely shows one possible example of structures/configurations/etc., and that other examples are contemplated within the scope of the invention. In general, the radiation monitor 10 is placed at an exterior location to perform the function of monitoring low-level gamma radiation in a local area atmosphere.

Turning first to the ionization chamber 12, it is to be appreciated that the ionization chamber 12 is schematically depicted in FIG. 1 for illustrative purposes. Indeed, the ionization chamber 12 includes any number of possible structures/configurations/etc. The ionization chamber 12 can be used in a wide variety of applications for monitoring and/or detecting radiation. For example, the ionization chamber 12 can be used in association with radiation safety applications, radiation monitoring of spent nuclear fuel, homeland security applications, etc. Of course, the ionization chamber 12 is not limited to these applications, and could be used in other applications that involve monitoring and/or detecting radiation.

In at least one example, the ionization chamber 12 includes a gas filled chamber with two electrodes: an anode and a cathode. The anode and cathode can be arranged as a cylindrical arrangement, parallel plates, or the like. A voltage bias (e.g., 400 volts) is applied between the anode and cathode to generate an electric field in the gas. The voltage bias can be provided by, for example, a power supply, including a battery or the like. In one example, the voltage bias is applied to the cathode while the anode is maintained at ground potential.

Gamma photons passing through the ionization chamber 12 will interact with the gas and one of the electrodes (e.g., anode or cathode) to generate ionized gas molecules. The amount of ionized gas molecules produced is a function of the number of photons, gamma ray energy, incident direction of the photons, etc. The ionization that is produced will be swept to the anode and cathode to generate an electric current flow. In some examples, this current is relatively small, such as on the order of femtoAmperes (e.g., $10^{-15}$) at background radiation levels. However, in other situations, the current may also be higher, such as in the range of 2.1 microamps (e.g., $10^{-6}$). The ionization chamber 12 can therefore generate this current flow in response to the presence of gamma radiation.

Turning next to the electrometer 14, the electrometer 14 will detect and/or measure the current generated in the ionization chamber 12. The electrometer 14 is operatively connected to the ionization chamber 12, such that the electrometer 14 can send and/or receive signals from the ionization chamber 12.

Turning now to the controller 16, the controller 16 is operatively connected to the electrometer 14. The controller 16 can calculate and store the measurement of the current flow into or out of the ionization chamber 12. The controller 16 may include any number of structures associated with ionization chambers and measuring ionization currents, such as analog to digital converters, memory, processors, etc. In some examples, the controller 16 includes a data acquisition system (DAQ) with associated DAQ hardware and software, such as a timer, processor modules, memory, or the like.

The controller 16 can include a power supply 17. The power supply 17 can supply power to the electrometer 14 and the ionization chamber 12. In one example, the power supply 17 can include a high voltage power supply capable of providing the voltage bias to the ionization chamber 12. The power supply 17 can include, for example, a battery, a battery charger, voltage regulators, and/or other devices/structures associated with supplying electric power. The controller 16 can further include a processor 18. The processor 18 can send/receive signals (e.g., digital signals) and carry-out any necessary corrections to the signals. The processor 18 can be connected to the power supply 17 for monitoring of the power supplied to the electrometer 14 and/or the ionization chamber 12.

Figure 2:
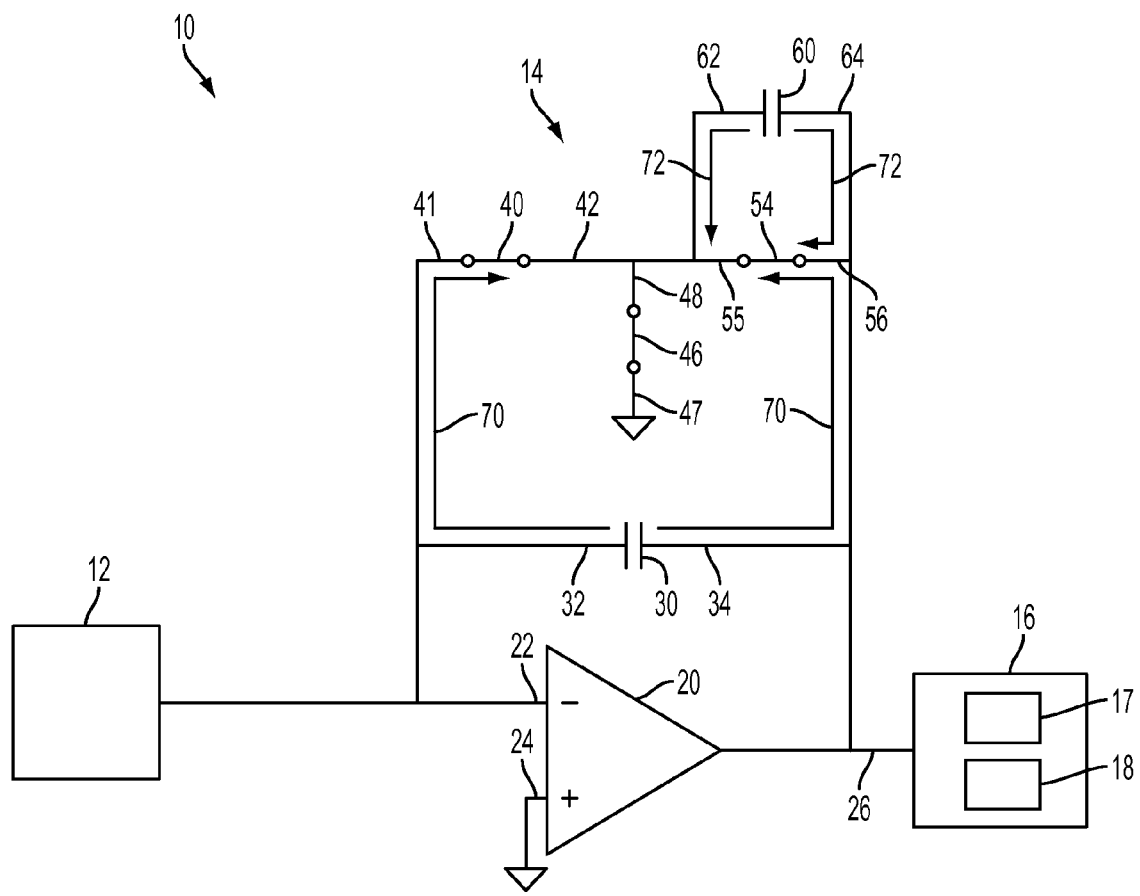
FIG. 2 is a schematic electrical diagram of the example radiation monitor including the electrometer in a reset mode.

Turning now to FIG. 2, an electrical schematic of an example of the radiation monitor 10 is shown. It is to be appreciated that while the electrometer 14 is generically/schematically depicted in FIG. 1, the electrical schematic of the electrometer 14 is shown in more detail in FIG. 2. The electrometer 14 is electrically connected to the ionization chamber 12 such that the electrometer 14 will send/receive electric current to/from the ionization chamber 12. In the shown example, the ionization chamber 12 is negatively biased such that current will flow from the electrometer 14 to the ionization chamber 12. Of course, in other examples, the ionization chamber 12 could be positively biased, with current flowing from ionization chamber 12 to electrometer 14.

It is to be appreciated that by generating the electric current flow, the ionization chamber 12 can either send or receive the electric current to/from the electrometer 14. For instance, in the present example, the ionization chamber 12 is negatively biased. Accordingly, the current will flow from the electrometer 14 to the ionization chamber 12. In another example, the ionization chamber 12 may be positively biased, such that current will flow from the ionization chamber 12 to the electrometer 14. In either of these two examples, the current flow is generated in response to the ionization that is detected, regardless of the direction of current flow.

Turning now to the details of the electrometer 14, the electrometer 14 includes an operational amplifier 20. The operational amplifier 20 includes an inverting input 22 and a non-inverting input 24. The non-inverting input 24 is connected to ground. The inverting input 22 is electrically connected to the ionization chamber 12. The operational amplifier 20 includes an output 26 (e.g., voltage output) that can be attached to the controller 16. In one example, the operational amplifier 20 can receive a signal (e.g., current signal) from the ionization chamber 12 and convert this signal to an analog voltage signal that is readable by the controller 16. In the present example, the inverting input 22 is held at virtual ground by the operational amplifier 20.

The electrometer 14 further includes a first capacitor 30. The first capacitor 30 has a first terminal 32 that is electrically connected to the inverting input 22 of the operational amplifier 20. The first capacitor 30 further has a second terminal 34 that is electrically connected to the output 26 of the operational amplifier 20. In one example, the first capacitor 30 is in a range of about, for example, 3 picofarads. In another example, the first capacitor 30 is in a range of about, for example, 4.7 picofarads. Of course, it is to be appreciated that the first capacitor 30 is not limited to these values, and could include other capacitances.

The electrometer 14 further includes at least one switch. In one example, the at least one switch includes a first switch 40, a second switch 46, and a third switch 54. In other examples, the electrometer 14 is not limited to including three switches, and instead could include greater than or fewer than the three switches shown in FIG. 2. As is generally known, the switches (e.g., first switch 40, second switch 46, and third switch 54) can be selectively opened or closed to interrupt current flowing therethrough. The switches in FIG. 2 are each depicted in a closed state, but as will be described with respect to FIGS. 3 and 4, the switches could similarly be released and moved to the opened state. In this example, the switches each include a single pole, single throw switch, though other switches are envisioned.

The first switch 40 includes a first terminal 41 and a second terminal 42. The first terminal 41 is electrically connected to the first terminal 32 of the first capacitor 30 and to the inverting input 22 of the operational amplifier 20.

The second switch 46 includes a first terminal 47 and a second terminal 48. The first terminal 47 of the second switch 46 is electrically connected to ground. The second terminal 48 of the second switch 46 is electrically connected to the second terminal 42 of the first switch 40.

The third switch 54 includes a first terminal 55 and a second terminal 56. The first terminal 55 is electrically connected to the second terminal 42 of the first switch and to the second terminal 48 of the second switch 46. The second terminal 56 of the third switch 54 is electrically connected to the second terminal 34 of the first capacitor 30 and to the output 26 of the operational amplifier 20.

The electrometer 14 further includes a second capacitor 60. The second capacitor 60 has a first terminal 62 that is electrically connected to the second terminal 42 of the first switch 40, to the second terminal 48 of the second switch 46, and to the first terminal 55 of the third switch 54. The second capacitor 60 further has a second terminal 64 that is electrically connected to the second terminal 56 of the third switch 54, to the second terminal 34 of the first capacitor 30, and to the output 26 of the operational amplifier 20.

In one example, the second capacitor 60 has a larger capacitance than the first capacitor 30. For instance, the second capacitor 60 can be in a range of about, for example, 470 picofarads. In another example, the second capacitor 60 is in a range of about, for example, 68 nanofarads. Of course, it is to be appreciated that the second capacitor 60 is not limited to these values, and could include other capacitances that may be larger or smaller.

Referring still to FIG. 2, an example operation of the electrometer 14 will now be described. The electrometer 14 is operable in a number of different modes, including a reset mode, a first mode, and a second mode. The reset mode, shown in FIG. 2, will allow for a periodic reset of the electrometer 14 by discharging the first capacitor 30 and second capacitor 60. In another example, the reset mode is initiated when current flowing through the output 26 of the operational amplifier 20 becomes too high.

During the reset mode, each of the switches, including the first switch 40, second switch 46, and third switch 54, are closed. As such, current will flow through the switches during the reset mode. As is generally known, the first capacitor 30 and second capacitor 60 each store an electric charge. Within the reset mode, the first switch 40, second switch 46, and third switch 54 are closed to allow current flow to be discharged from the first capacitor 30 and second capacitor 60. For example, a first current flow 70 (shown generically/schematically with arrows) will flow from the first capacitor 30, through the switches, and to ground (connected to the second switch 46). The first current flow 70 can travel along one of two paths. A first path for the first current flow 70 is from the first terminal 32, through the first switch 40 and through the second switch 46 to ground. A second path for the first current flow 70 is from the second terminal 34, through the third switch 54, and through the second switch 46 to ground.

In addition to the first capacitor 30, the second capacitor 60 will also discharge during the reset mode. For example, a second current flow 72 (shown generically/schematically with arrows) will flow from the second capacitor 60, through the switches, and to ground. The second current flow 72 can travel along one of two paths. A first path for the second current flow 72 is from the first terminal 62 and through the second switch 46 to ground. A second path for the second current flow 72 is from the second terminal 64, through the third switch 54 and through the second switch 46 to ground.

Figure 3:
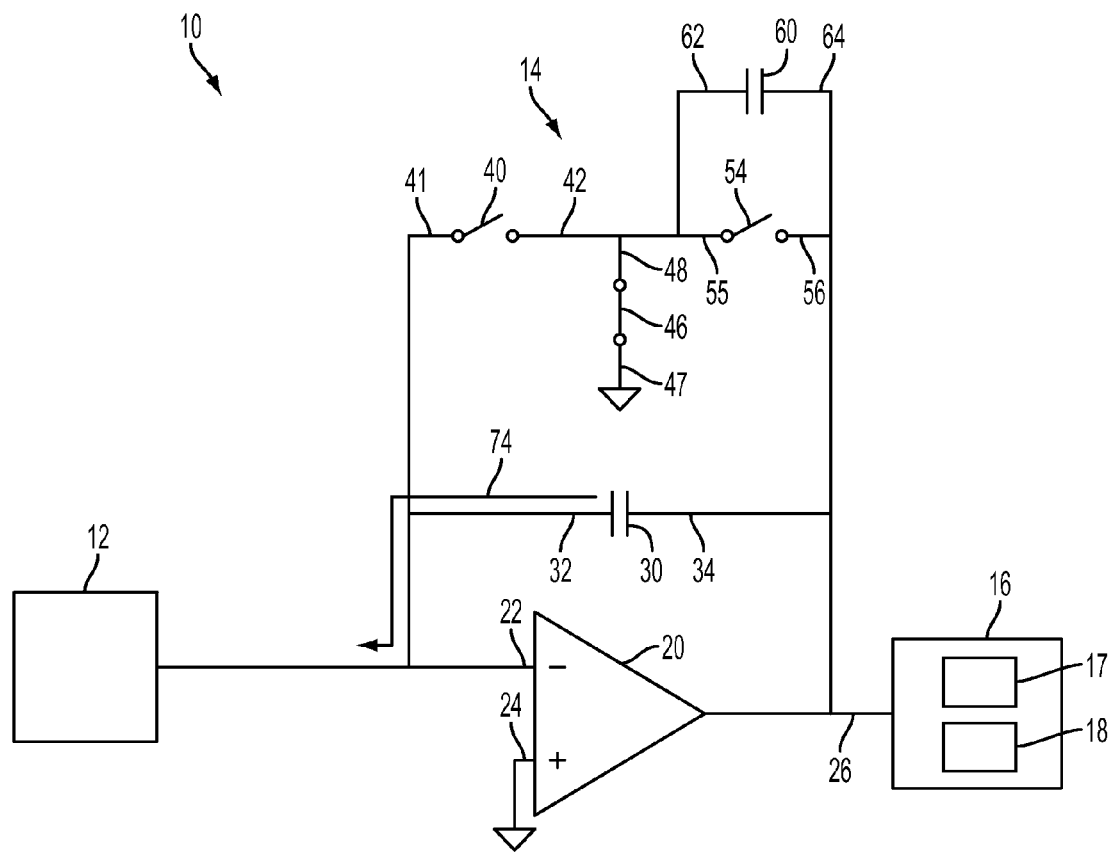
FIG. 3 is a schematic electrical diagram of the example radiation monitor including the electrometer in a first mode.

Turning now to FIG. 3, the first mode of operation of the electrometer 14 is shown. The first mode of operation is used, for example, to detect a first range of currents, such as relatively small currents in the ionization chamber 12. In one possible example, the first mode of operation is used to detect background radiation levels, which generate relatively small current levels. Indeed, the capacitance of the first capacitor 30 (e.g., 3 picofarads to 4.7 pf, for picofarads) is smaller than the capacitance of the second capacitor 60 (e.g., 470 picofarads to 68 nanofarads, for example). The relatively small capacitance of the first capacitor 30 as compared to the second capacitor 60 allows for more accurate detection of relatively small current levels, such as during monitoring of background radiation levels and/or periods of low radiation.

During the first mode of operation, the first switch 40 and the third switch 54 can be opened while the second switch 46 is closed. Due to the second switch 46 being closed and connected to ground at the first terminal 47, there is a zero voltage potential across the first switch 40. When the potential across two terminals (e.g., first terminal 41 and second terminal 42 of the first switch 40) is zero, current will not flow through the terminals. This zero voltage potential will limit current leakage across the first switch 40. As such, a current flow 74 will travel from the first capacitor 30, through the first terminal 32, and to the ionization chamber 12.

Figure 4:
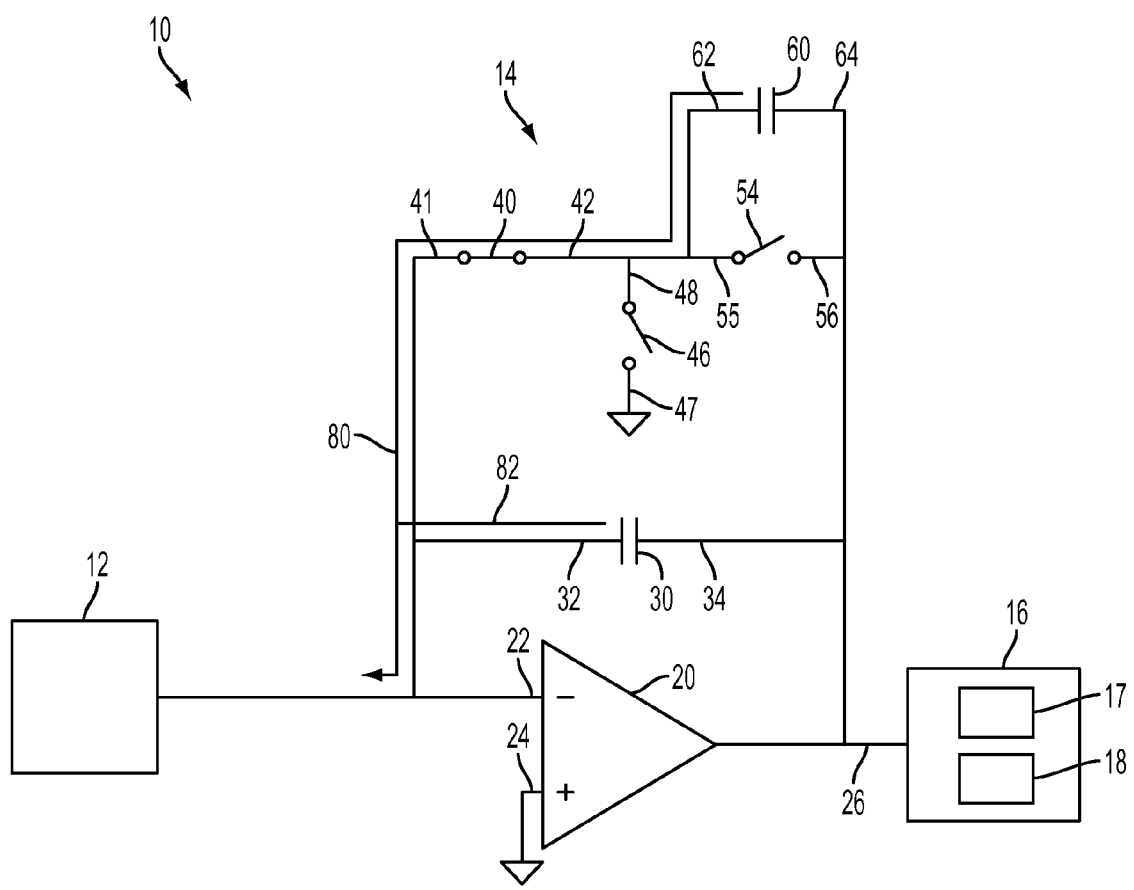
FIG. 4 is a schematic electrical diagram of the example radiation monitor including the electrometer in a second mode.

Turning now to FIG. 4, the second mode of operation of the electrometer 14 is shown. The second mode of operation is used, for example, to detect a second range of currents, such as relatively large currents in the ionization chamber 12 as compared to the first mode of operation. In one possible example, the relatively large currents are generated in response to relatively higher levels of radiation within the ionization chamber 12. Indeed, the capacitance of the first capacitor 30 (e.g., 3 picofarads to 4.7 pf, for picofarads) combined with the capacitance of the second capacitor 60 (e.g., 470 picofarads to 68 nanofarads, for example) is significantly larger than the capacitance of the first capacitor 30 alone (shown in FIG. 3). This relatively larger capacitance of the first capacitor 30 combined with the second capacitor 60 allows for more accurate detection of the relatively larger current levels, such as during the monitoring of high levels of radiation.

During the second mode of operation, the first switch 40 is closed. The second switch 46 and third switch 54 are opened. As such, a current flow 80 will travel from the second capacitor 60, through the first terminal 62, through the first switch 40, and to the ionization chamber 12. Similarly, a current flow 82 will travel from the first capacitor 30, through the first terminal 32, and to the ionization chamber 12.

The opening and closing of the first switch 40, second switch 46, and third switch 54 are controlled in any number of ways. In one possible example, the switches include an optoisolator (e.g., optocoupler, photocoupler, optical isolator, etc.). In such an example, a light source, such as a light emitting diode (LED), can selectively shine on a photosensor to cause the switches to open or close. The light source can be controlled by, for example, the controller 16. On example device is a Toshiba TLP3250 photocoupler. Of course, the switches are not limited to this example, and could be selectively opened and closed in any number of ways.

The first switch 40, second switch 46, and third switch 54 can be selectively opened or closed such that the electrometer 14 will operate in the reset mode (FIG. 2), first mode of operation (FIG. 3) or second mode of operation (FIG. 4). Operation in the first mode or second mode is based on the magnitude of current being drawn into the ionization chamber 12. In particular, when a voltage is applied to a capacitor, the capacitor generates a current governed by the equation $I=C \times (dV/dt)$. I represents the current output, C represents the capacitance of the capacitor (e.g., first capacitor 30 and/or second capacitor 60), and $(dV/dt)$ is the rate of change of the input voltage. Therefore, in one example, if a voltage applied to one or both of the capacitors from the power supply 17 is ramped at a constant rate, then $(dV/dt)$ becomes a constant. As a result, if the capacitance of the capacitors remains constant, the resulting current signal produced by the capacitor will be of constant magnitude.

Using this relationship, the electrometer 14 will switch between the first mode of operation, second mode of operation, or the reset mode of operation. Within the first mode of operation, radiation levels detected by the ionization chamber 12 are relatively low (e.g., background radiation levels). As such, a relatively small current, proportional to the low radiation levels, is generated. In this example, since the ionization chamber 12 is negatively biased, this low level of current is drawn into the ionization chamber 12 from the electrometer 14.

The low level of current drawn into the ionization chamber 12 will produce a relatively low ramping voltage into the capacitor (e.g., first capacitor 30) with a shallow slope. This low ramping voltage is detected by the controller 16 and, in response, the first mode of operation is initiated. As described above, during the first mode of operation, the first switch 40 and the third switch 54 are opened while the second switch 46 is closed. Accordingly, current leakage across the first switch 40 and third switch 54 is minimized, and accurate measurement of the radiation levels is achieved.

Within the second mode of operation, radiation levels detected by the ionization chamber 12 are relatively high. As such, a relatively larger current, proportional to the higher radiation levels, is generated. The higher level of current drawn into the ionization chamber 12 will produce a higher ramping voltage into the capacitors (e.g., first capacitor 30 and second capacitor 60) with a relatively steeper slope. This higher ramping voltage is detected by the controller 16 and, in response, the second mode of operation is initiated. As described above, during the second mode of operation, the first switch 40 is closed while the second switch 46 and the third switch 54 are opened. Accordingly, current leakage across the second switch 46 and third switch 54 is minimized, and accurate measurement of the radiation levels is achieved.

Figure 5:
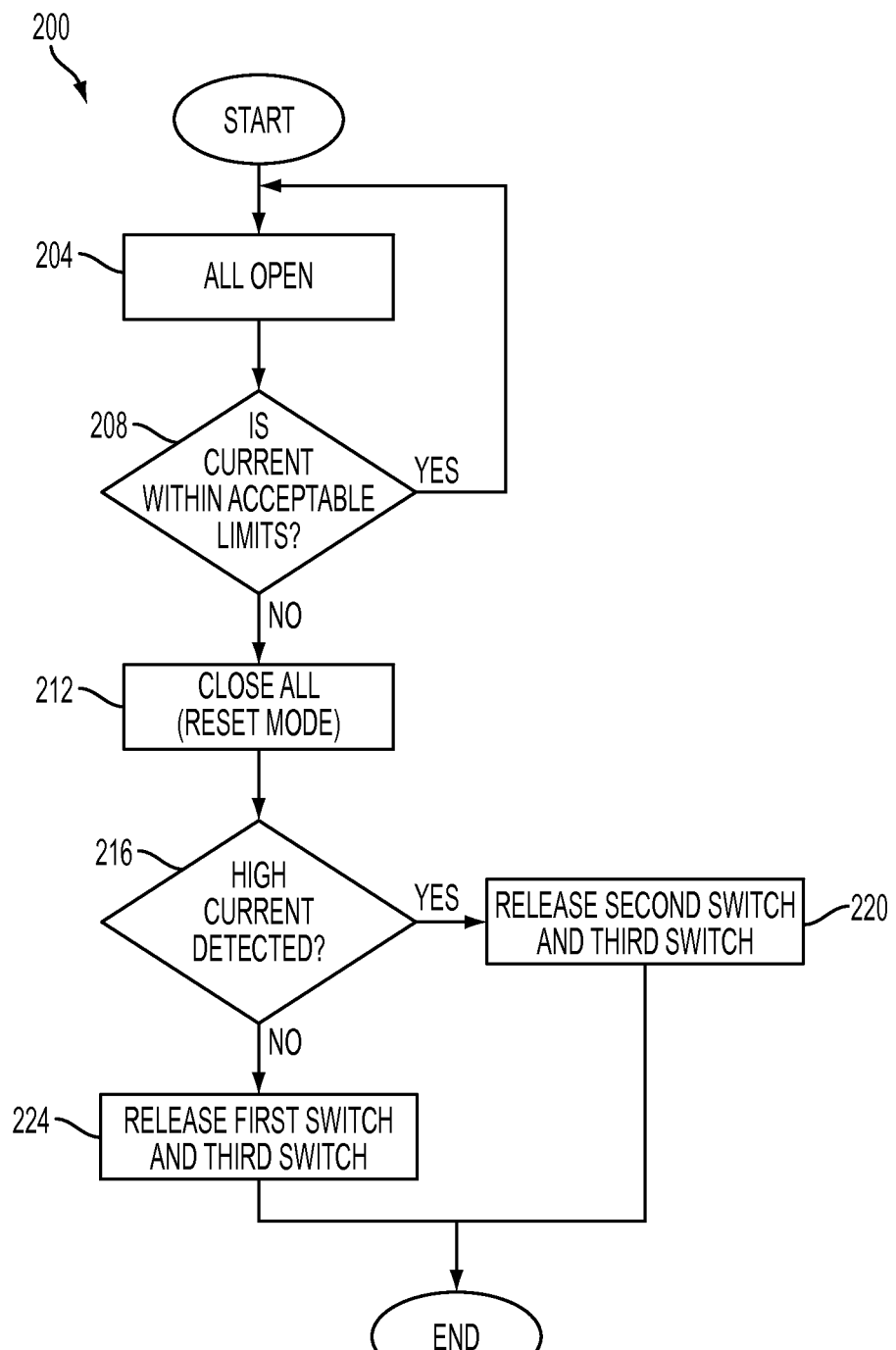
FIG. 5 is a top level flow diagram of an example method of measuring current flow through the electrometer of the radiation monitor.

Turning now to FIG. 5, a flow diagram of an example method 200 for measuring current flow through the electrometer 14 of the radiation monitor 10 is shown. This method 200 can be performed in connection with the example radiation monitor 10 and electrometer 14 shown and described with respect to FIGS. 1 to 4. The method 200 can include an initial step 204 of all of the switches being opened. In particular, the first switch 40, second switch 46, and third switch 54 can initially be selectively opened. Next, in step 208, the controller 16 can determine whether the current flow is within an acceptable limit. For instance, if the current flow is too low or too high (i.e., referred to as "hitting the rails"), then the current is not within an acceptable limit.

Next, as shown in step 212, the switches are all closed in response to the current being too low or too high. With the switches all closed, the electrometer 14 is in the reset mode (shown in FIG. 2). The reset mode allows for a periodic reset of the electrometer 14 by discharging the first capacitor 30 and second capacitor 60.

Next, as shown in step 216, the controller 16 can determine whether a high current is detected. If a high current is detected, the controller 16 can trigger the second switch 46 and third switch 54 to be released/opened (shown in step 220). Indeed, as described above with respect to FIG. 4, when the first switch 40 is closed while the second switch 46 and third switch 54 are opened, the electrometer 14 is in the second mode. This second mode is used, for example, to detect relatively large currents flowing into the ionization chamber 12. The second mode allows for relatively accurate detection of the larger current levels, such as during monitoring of high radiation levels.

If a high current is not detected in step 216, such that a relatively low current is flowing into the ionization chamber 12, then the controller 16 can trigger the first switch 40 and third switch 54 to be released/opened (shown in step 224). As described above with respect to FIG. 3, when the first switch 40 and third switch 54 are opened while the second switch 46 is closed, the electrometer 14 is in the first mode. This first mode is used, for example, to detect relatively small currents flowing into the ionization chamber 12. The first mode allows for relatively accurate detection of the smaller current levels.

By providing the electrometer 14 with the first switch 40, second switch 46, and third switch 54, a relatively fast gain change can be monitored with minimal current leakage occurring. Further, the current is limited from leaking even over a wide range of temperatures. Indeed, the configuration of the switches and capacitors will ensure minimal current leakage even over a temperature range of, for example, 50° to 60° Celsius and/or above an ambient temperature of 35° Celsius.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A radiation monitor including:
an ionization chamber for detecting radiation that passes into the ionization chamber, the ionization chamber generating a current flow in response to the detected radiation; and
an electrometer electrically connected to the ionization chamber for measuring the current flow generated by the ionization chamber, the electrometer including an amplifier having at least one input connected to the ionization chamber and an output, a first capacitor having first and second terminals respectively connected to the at least one input and the output such that the first capacitor is directly connected between the at least one input and the output, a second capacitor selectively connectable between the at least one input and the output, a plurality of switches operable for selectively connecting the second capacitor between the at least one input and the output and for selectivity connecting the at least one input and the output directly together and to ground, wherein the electrometer is configured, via operation of the plurality of switches, to be operable in a plurality of modes based on a magnitude of the current flow generated by the ionization chamber, the second capacitor having first and second terminals with the second terminal of the second capacitor being connected to the output, the plurality of switches includes a first switch connected between the at least one input and the first terminal of the second capacitor with the first terminal of the second capacitor being connected to the at least one input when the first switch is closed, a second switch connected between the first terminal of the second capacitor and ground with the first terminal of the second capacitor being connected to ground when the second switch is closed, and a third switch connected parallel to the second capacitor between the first and second terminals of the second capacitor with the first and second terminals of the second capacitor being connected when the third switch is closed.

2. The radiation monitor of claim 1, wherein the first capacitor having a first capacitance and the second capacitor having a second, different capacitance.

3. The radiation monitor of claim 1, wherein the plurality of modes in which the electrometer is operable includes a first mode in which the first switch and the third switch are opened and the second switch is closed such that the first terminal of the second capacitor is connected to ground.

4. The radiation monitor of claim 3, wherein the plurality of modes includes a second mode in which the second switch and third switch are opened and the first switch is closed such that the first terminal of the second capacitor is connected to the at least one input in addition of the connection of the first capacitor to the at least one input.

5. The radiation monitor of claim 4, wherein the plurality of modes includes a reset mode in which each of the first switch, second switch, and third switch are closed such that the at least one input and the output are connected to ground, the first and second terminals of the first capacitor are connected to ground, and the first and second terminals of the second capacitor are connected to ground.

6. The radiation monitor of claim 4, wherein the electrometer is configured to be operable in the first mode in response to the measured current flow being within a first range.

7. The radiation monitor of claim 6, wherein the electrometer is configured to be operable in the second mode in response to the measured current flow being within a second range that is larger than the first range.

8. The radiation monitor of claim 1, wherein at least one of the first-third switches include an opto-isolator.

9. A method of measuring current flow through an electrometer of a radiation monitor including:
providing an ionization chamber for detecting radiation, the ionization chamber generating a current flow in response to detected radiation;
providing the electrometer electrically connected to the ionization chamber for measuring the current flow of the ionization chamber, the step of providing the electrometer such that the electrometer including an amplifier having at least one input and an output, a first capacitor having first and second terminals respectively connected to the at least one input and the output such that the first capacitor is directly connected between the at least one input and the output, a second capacitor selectively connectable between the at least one input and the output, a plurality of switches operable for selectively connecting the second capacitor between the at least one input and the output and for selectivity connecting the at least one input and the output directly together and to ground, the second capacitor having first and second terminals with the second terminal of the second capacitor being connected to the output, the plurality of switches includes a first switch connected between the at least one input and the first terminal of the second capacitor with the first terminal of the second capacitor being connected to the at least one input when the first switch is closed, a second switch connected between the first terminal of the second capacitor and ground with the first terminal of the second capacitor being connected to ground when the second switch is closed, and a third switch connected parallel to the second capacitor between the first and second terminals of the second capacitor with the first terminal and the second terminal of the second capacitor being connected to output when the third switch is closed;
operating the electrometer in a first mode in response to the measured current being within a first range such that current does not flow through the first switch, and the first terminal of the second capacitor is connected to ground;
operating the electrometer in a second mode in response to the measured current being within a second range, including operating the first, second and third switches to open the second switch, open the third switch and close the first switch such that the first terminal of the second capacitor is connected to the at least one input in addition of the connection of the first capacitor to the at least one input; and
operating the electrometer in a reset mode, including operating the first, second and third switches to close the first, second and third switches such that the at least one input and the output are connected to ground, the first and second terminals of the first capacitor are connected to ground, and the first and second terminals of the second capacitor are connected to ground.

* * * * *